US012145507B2

(12) United States Patent
LaCross et al.

(10) Patent No.: US 12,145,507 B2
(45) Date of Patent: Nov. 19, 2024

(54) INTERIOR REARVIEW MIRROR ASSEMBLY WITH ACTUATOR

(71) Applicant: Magna Mirrors of America, Inc., Holland, MI (US)

(72) Inventors: Anthony J. LaCross, Hastings, MI (US); Robert L. Esser, Grand Rapids, MI (US); Gregory A. Huizen, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 632 days.

(21) Appl. No.: 17/301,898

(22) Filed: Apr. 19, 2021

(65) Prior Publication Data

US 2021/0323477 A1    Oct. 21, 2021

Related U.S. Application Data

(60) Provisional application No. 63/198,589, filed on Oct. 29, 2020, provisional application No. 63/012,448, filed on Apr. 20, 2020.

(51) Int. Cl.
*B60R 1/12*     (2006.01)
*B60R 1/04*     (2006.01)

(52) U.S. Cl.
CPC ............. *B60R 1/12* (2013.01); *B60R 1/04* (2013.01); *B60R 2001/1253* (2013.01)

(58) Field of Classification Search
CPC ..... B60R 1/12; B60R 1/04; B60R 2001/1253; B60R 1/072; B60R 1/074; B60R 1/076; B60R 1/062

(Continued)

(56) References Cited

U.S. PATENT DOCUMENTS 2,263,382 A    11/1941    Gotzinger
2,580,014 A    12/1951    Gazda
(Continued)

FOREIGN PATENT DOCUMENTS

EP    0356099 A2    2/1990
EP    1176056 A2    1/2002
(Continued)

OTHER PUBLICATIONS

Hicks et al., "Panoramic Electronic Rear Vision for Automotive Applications" SAE Technical Paper Series 1999-01-0655, Detroit, MI Mar. 1-4, 1999.

*Primary Examiner* — Tuyen Tra
*Assistant Examiner* — Rahman Abdur
(74) *Attorney, Agent, or Firm* — HONIGMAN LLP

(57) ABSTRACT

A vehicular interior rearview mirror assembly includes a mirror head and a mirror mount that attaches at the interior surface of the vehicle. The mirror head includes an actuator having a body portion attached at a back plate at the rear of the reflective element and an adapter plate attached at the mirror mount and pivotable relative to the body portion. The actuator includes a pair of arcuate gear elements that attach at one end to the adapter plate and that are movably received at the body portion. The actuator includes a pair of motors operable to rotatably drive respective gears that engage the respective arcuate gear elements. When the gears are rotably driven, the gears impart pivotal movement of the body portion and mirror head in tandem relative to the mirror mount to adjust the mirror head relative to provide a rearward view for a driver of the vehicle.

25 Claims, 12 Drawing Sheets

(58) Field of Classification Search
USPC .................................................. 359/872, 876
See application file for complete search history.

(56) References Cited

U.S. PATENT DOCUMENTS

| | | | |
|---|---|---|---|
| 3,266,016 A | 8/1966 | Maru | |
| 4,499,451 A | 2/1985 | Suzuki et al. | |
| 4,588,267 A | 5/1986 | Pastore | |
| 4,623,222 A | 11/1986 | Itoh et al. | |
| 4,630,904 A | 12/1986 | Pastore | |
| 4,721,364 A | 1/1988 | Itoh et al. | |
| 4,906,085 A | 3/1990 | Sugihara et al. | |
| 5,313,335 A | 5/1994 | Gray et al. | |
| 5,355,284 A | 10/1994 | Roberts | |
| 5,436,741 A | 7/1995 | Crandall | |
| 5,477,390 A * | 12/1995 | Boddy | B60R 1/074 359/872 |
| 5,481,409 A | 1/1996 | Roberts | |
| 5,530,240 A | 6/1996 | Larson et al. | |
| 5,575,552 A | 11/1996 | Faloon et al. | |
| 5,587,699 A | 12/1996 | Faloon et al. | |
| 5,668,663 A | 9/1997 | Varaprasad et al. | |
| 5,724,187 A | 3/1998 | Varaprasad et al. | |
| 5,786,772 A | 7/1998 | Schofield et al. | |
| 5,788,357 A | 8/1998 | Muth et al. | |
| 5,938,166 A | 8/1999 | Seichter et al. | |
| 5,938,320 A | 8/1999 | Crandall | |
| 5,956,181 A | 9/1999 | Lin | |
| 6,005,724 A | 12/1999 | Todd | |
| 6,045,243 A | 4/2000 | Muth et al. | |
| 6,111,683 A | 8/2000 | Cammenga et al. | |
| 6,257,746 B1 | 7/2001 | Todd et al. | |
| 6,264,353 B1 | 7/2001 | Caraher et al. | |
| 6,329,925 B1 | 12/2001 | Skiver et al. | |
| 6,356,376 B1 | 3/2002 | Tonar et al. | |
| 6,428,172 B1 | 8/2002 | Hutzel et al. | |
| 6,512,624 B2 | 1/2003 | Tonar et al. | |
| 6,642,840 B2 | 11/2003 | Lang et al. | |
| 6,690,268 B2 | 2/2004 | Schofield et al. | |
| 6,700,692 B2 | 3/2004 | Tonar et al. | |
| 7,184,190 B2 | 2/2007 | McCabe et al. | |
| 7,195,381 B2 | 3/2007 | Lynam et al. | |
| 7,224,324 B2 | 5/2007 | Quist et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,338,177 B2 | 3/2008 | Lynam | |
| 7,370,983 B2 | 5/2008 | DeWind et al. | |
| 7,446,650 B2 | 11/2008 | Scholfield et al. | |
| 7,446,924 B2 | 11/2008 | Schofield et al. | |
| 7,488,080 B2 | 2/2009 | Skiver et al. | |
| 7,581,859 B2 | 9/2009 | Lynam | |
| 7,626,749 B2 | 12/2009 | Baur et al. | |
| 7,777,611 B2 | 8/2010 | Desai | |
| 7,855,755 B2 | 12/2010 | Weller et al. | |
| 8,154,418 B2 | 4/2012 | Peterson et al. | |
| 8,508,831 B2 | 8/2013 | De Wind et al. | |
| 8,730,553 B2 | 5/2014 | De Wind et al. | |
| 8,960,629 B2 | 2/2015 | Rizk et al. | |
| 9,346,403 B2 | 5/2016 | Uken et al. | |
| 9,598,016 B2 | 3/2017 | Blank et al. | |
| 9,827,913 B2 | 11/2017 | De Wind et al. | |
| 10,029,614 B2 | 7/2018 | Larson | |
| 10,046,706 B2 | 8/2018 | Larson et al. | |
| 10,166,924 B2 | 1/2019 | Baur | |
| 10,421,404 B2 | 9/2019 | Larson et al. | |
| 10,442,360 B2 | 10/2019 | LaCross et al. | |
| 11,214,199 B2 | 1/2022 | LaCross et al. | |
| 11,465,561 B2 | 10/2022 | Peterson et al. | |
| 11,498,494 B2 | 11/2022 | Lynam et al. | |
| 11,505,123 B2 | 11/2022 | Lu | |
| 2004/0027694 A1 | 2/2004 | Lin | |
| 2004/0027695 A1 | 2/2004 | Lin | |
| 2006/0050018 A1 | 3/2006 | Hutzel et al. | |
| 2008/0049344 A1 * | 2/2008 | DeWard | B60R 1/04 359/872 |
| 2008/0073477 A1 | 3/2008 | Lang et al. | |
| 2012/0038964 A1 | 2/2012 | De Wind et al. | |
| 2012/0236388 A1 | 9/2012 | De Wind et al. | |
| 2014/0022390 A1 | 1/2014 | Blank et al. | |
| 2014/0097320 A1 | 4/2014 | Rizk et al. | |
| 2014/0268355 A1 | 9/2014 | Lee et al. | |
| 2014/0285666 A1 | 9/2014 | O'Connell et al. | |
| 2014/0293169 A1 | 10/2014 | Uken et al. | |
| 2015/0085337 A1 | 3/2015 | Lee et al. | |
| 2015/0097955 A1 | 4/2015 | De Wind et al. | |
| 2016/0082890 A1 | 3/2016 | Habibi et al. | |
| 2016/0129842 A1 | 5/2016 | Kuester | |
| 2016/0250970 A1 | 9/2016 | Kuester et al. | |
| 2016/0250972 A1 | 9/2016 | Kuester et al. | |
| 2016/0250974 A1 | 9/2016 | Kuester et al. | |
| 2016/0275833 A1 | 9/2016 | Forbes et al. | |
| 2016/0341963 A1 | 11/2016 | Minikey, Jr. et al. | |
| 2017/0088055 A1 | 3/2017 | Cammenga et al. | |
| 2017/0248787 A1 | 8/2017 | Lee et al. | |
| 2017/0297498 A1 | 10/2017 | Larson et al. | |
| 2017/0327044 A1 | 11/2017 | Baur | |
| 2017/0355312 A1 | 12/2017 | Habibi et al. | |
| 2018/0134217 A1 | 5/2018 | Peterson et al. | |
| 2018/0244204 A1 | 8/2018 | Boehm | |
| 2018/0251069 A1 * | 9/2018 | LaCross | H04N 23/63 |
| 2018/0329210 A1 | 11/2018 | Lee et al. | |
| 2019/0047475 A1 | 2/2019 | Uken et al. | |
| 2019/0118717 A1 | 4/2019 | Blank et al. | |
| 2019/0146297 A1 | 5/2019 | Lynam et al. | |
| 2019/0258131 A9 | 8/2019 | Lynam et al. | |
| 2019/0381938 A1 * | 12/2019 | Hopkins | G06F 3/013 |
| 2022/0324384 A1 | 10/2022 | Steffes | |

FOREIGN PATENT DOCUMENTS

| | | |
|---|---|---|
| EP | 2789505 A1 | 10/2014 |
| JP | 62075619 | 4/1987 |
| JP | 2002120649 A | 4/2002 |
| JP | 2010143250 A | 7/2010 |
| JP | 2010163104 A | 7/2010 |
| WO | 2003084780 A2 | 10/2003 |
| WO | 2004012963 A1 | 2/2004 |
| WO | 2004098953 A2 | 11/2004 |
| WO | 2017191558 A1 | 11/2017 |

* cited by examiner

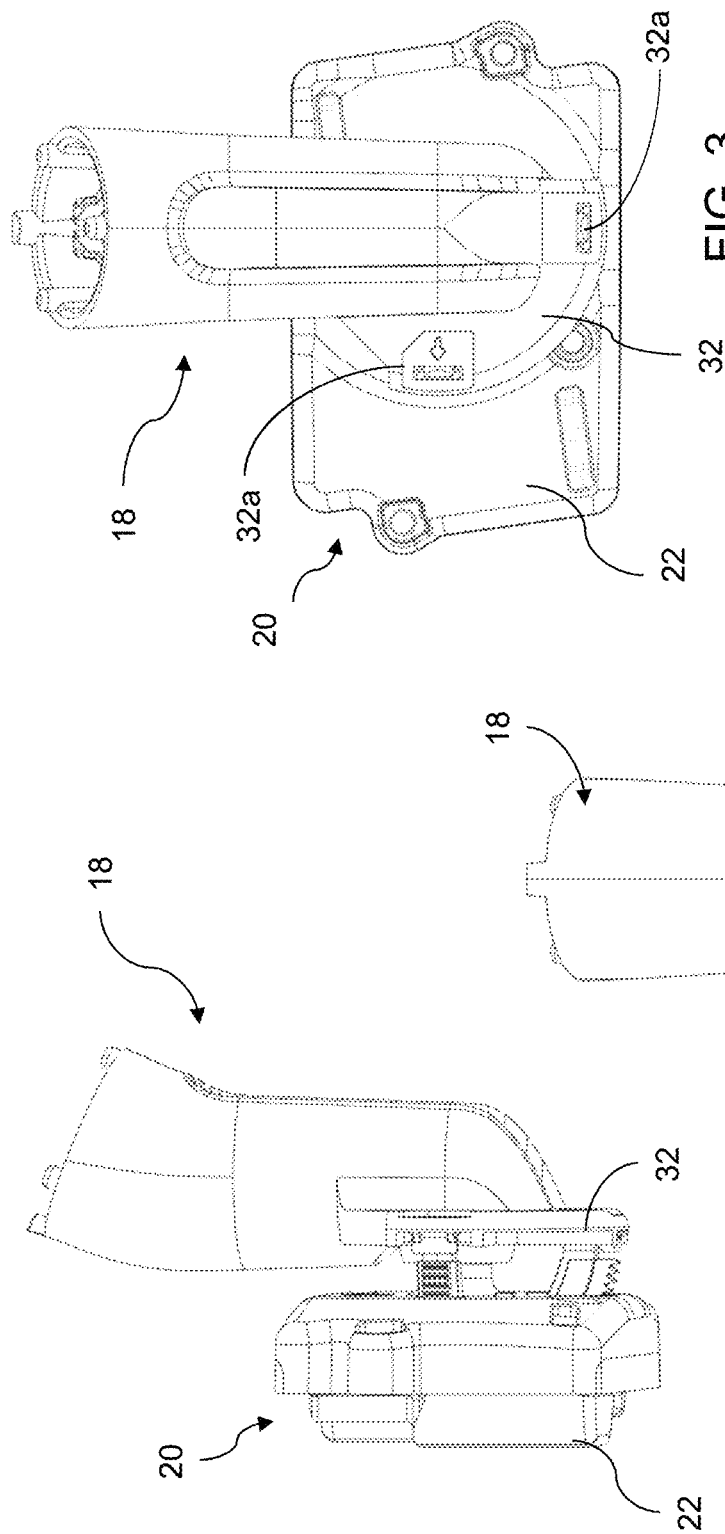

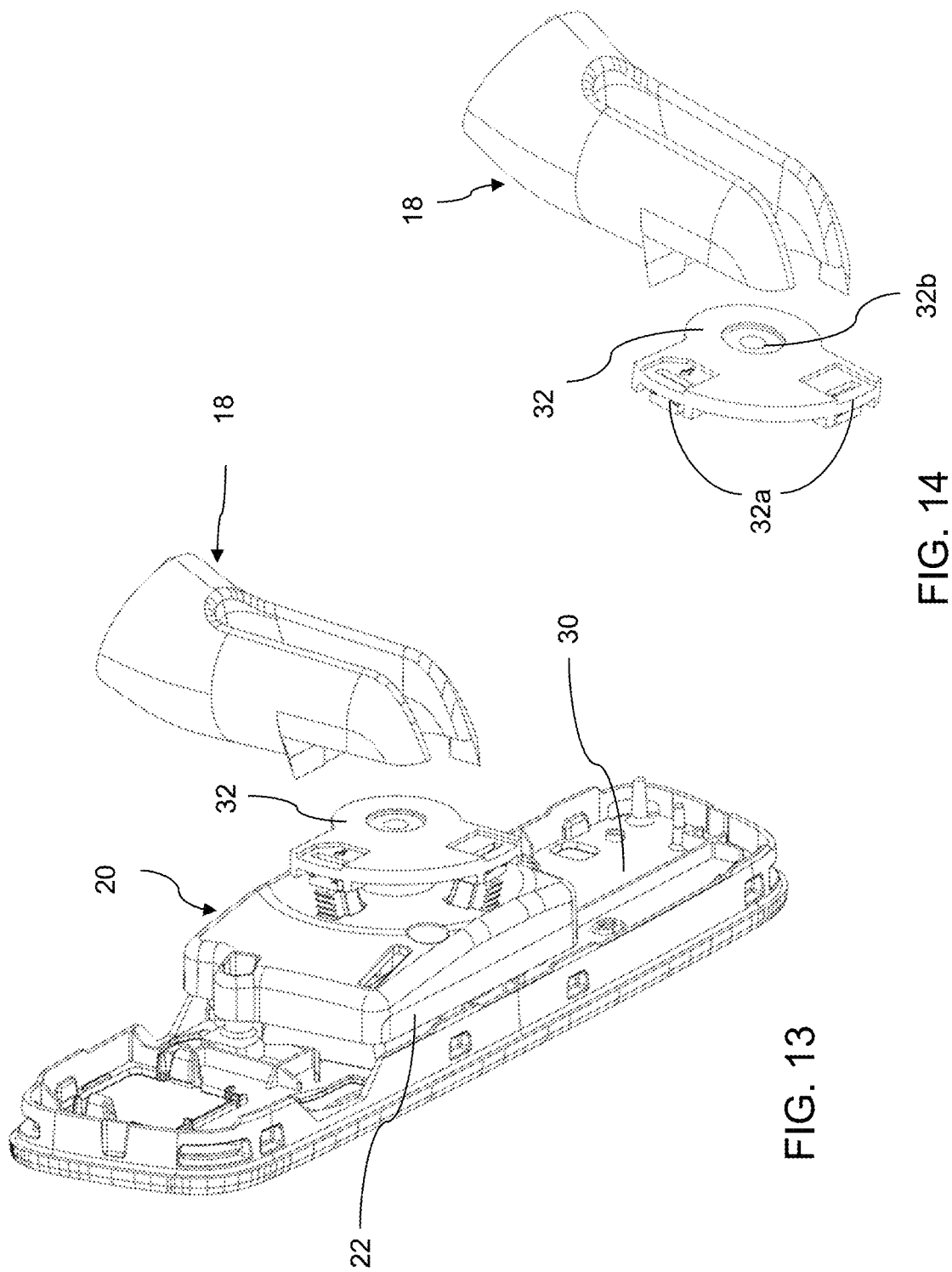

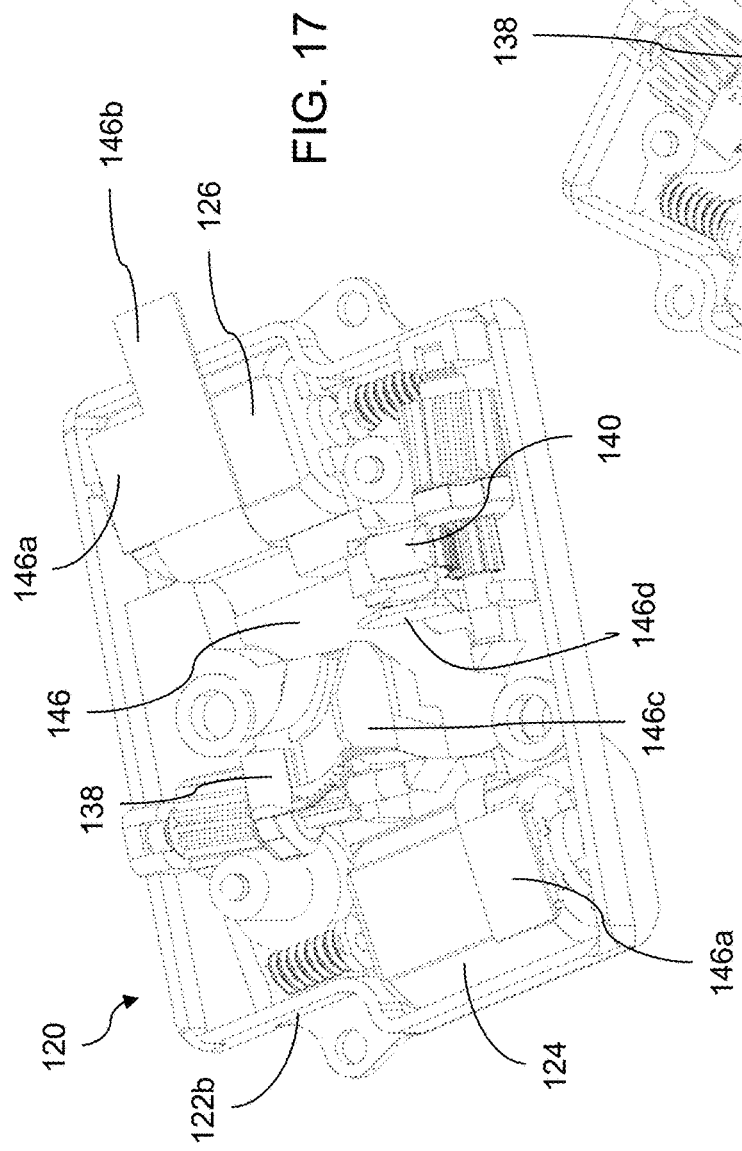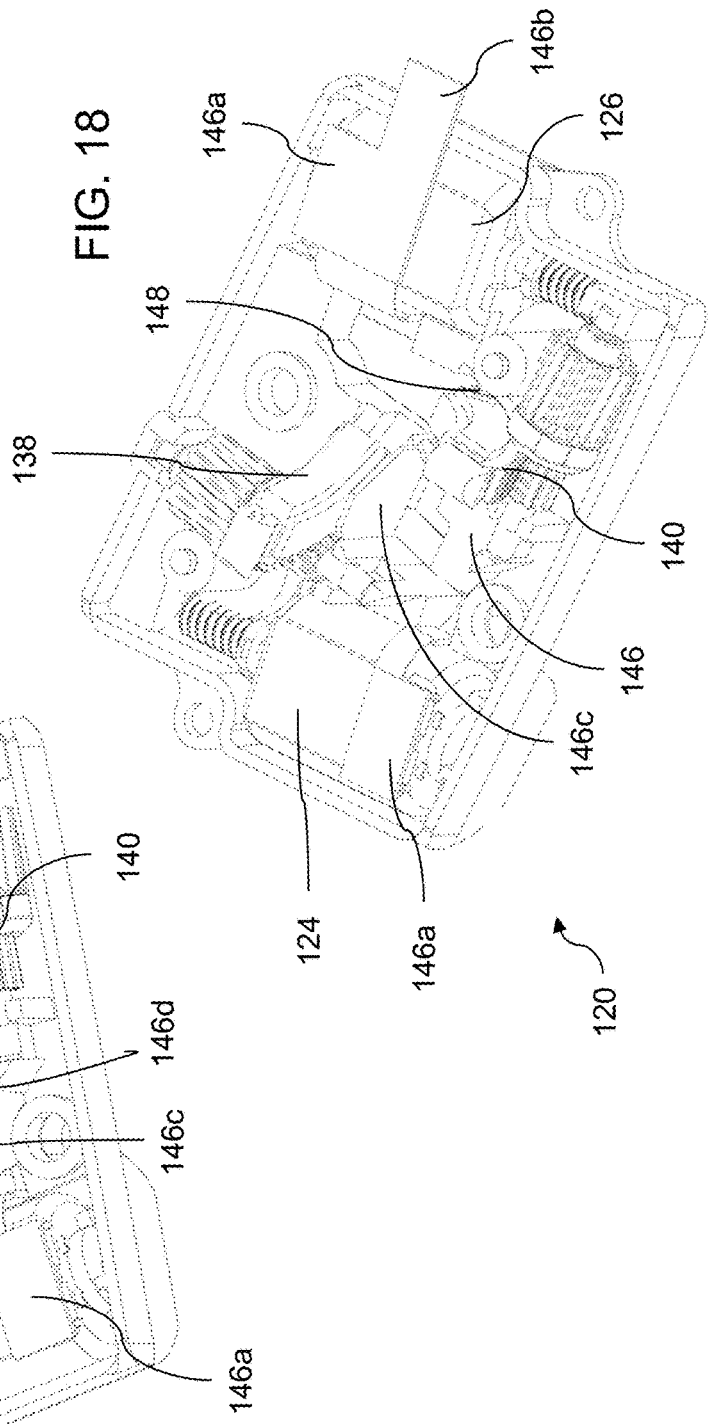

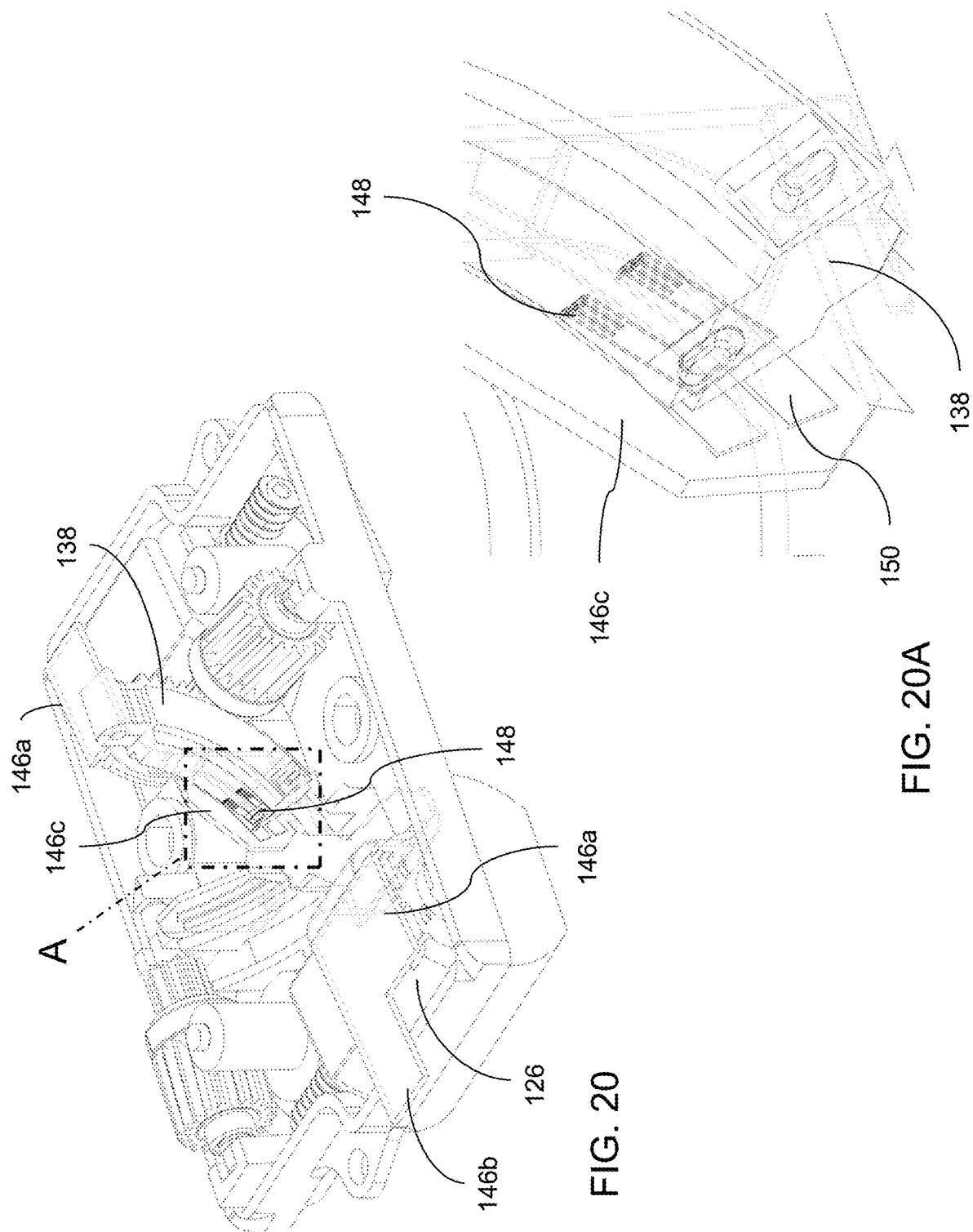

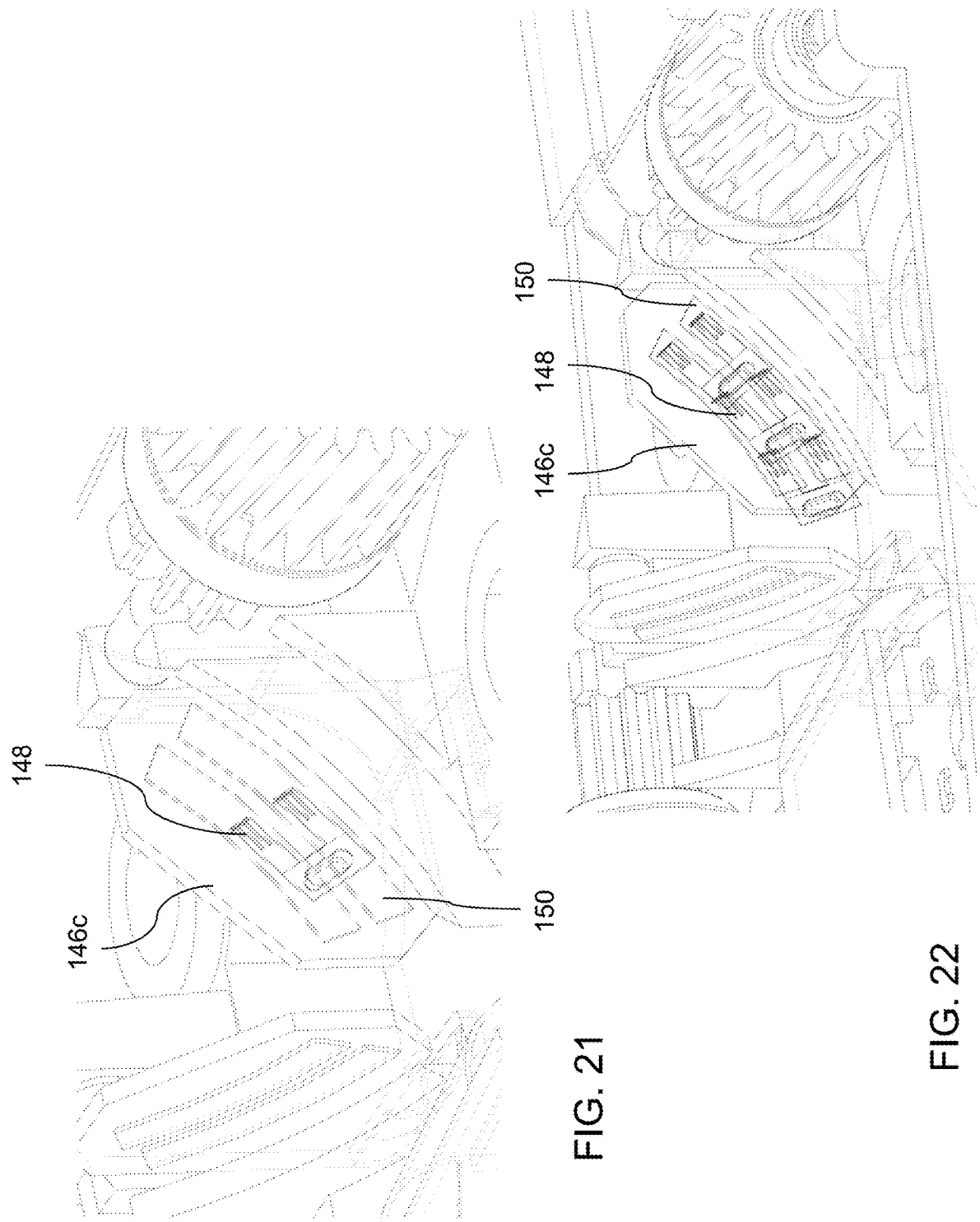

INTERIOR REARVIEW MIRROR ASSEMBLY WITH ACTUATOR

CROSS REFERENCE TO RELATED APPLICATIONS

The present application claims the filing benefits of U.S. provisional application Ser. No. 63/198,589, filed Oct. 29, 2020, and U.S. provisional application Ser. No. 63/012,448, filed Apr. 20, 2020, which are hereby incorporated herein by reference in their entireties.

FIELD OF THE INVENTION

The present invention relates to interior rearview mirror systems and, more particularly, to an interior rearview mirror system having a display at the interior rearview mirror for viewing by the driver of the vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide a display screen at the mirror assembly. A variety of interior and exterior mirror assemblies with indicators and/or displays are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

A vehicular interior rearview mirror assembly comprises (i) a mirror head having a reflective element and (ii) a mirror mount that attaches at an interior portion of the vehicle. The mirror head pivotally attaches at the mirror mount. A back plate has a front side and a rear side separated by a thickness of the back plate. The reflective element is attached at the front side of the back plate. The mirror head comprises an actuator attached at the rear side of the back plate. The actuator comprises a body portion attached at the back plate and an adapter plate that is pivotable relative to the body portion. The adapter plate attaches at the mirror mount. The actuator comprises a pair of arcuate gear elements that attach at one end to the adapter plate and that are movably received at the body portion. The actuator comprises a pair of motors operable to rotatably drive respective gears that engage the respective arcuate gear elements. The gears move the respective arcuate gear elements to impart pivotal movement of the body portion and the mirror head relative to the adapter plate and the mirror mount. With the mirror mount attached at the interior portion of the vehicle, the actuator, when actuated, pivots the body portion and the mirror head in tandem relative to the mirror mount to adjust the mirror head to provide a rearward view for a driver of the vehicle. In some embodiments, the actuator also provides a memory position or orientation function so that the mirror assembly may store in memory a selected or preferred orientation of the mirror head and operate the actuator to pivot the mirror head to that orientation, such as responsive to a user actuatable input. In some embodiments, the actuator also includes a clutch subassembly that allows for movement of the respective arcuate gear elements independent of actuation of the respective motors.

These and other objects, advantages, purposes and features of the present invention will become apparent upon review of the following specification in conjunction with the drawings.

BRIEF DESCRIPTION OF THE DRAWINGS

FIG. 2 is a side elevation of an actuator operable to pivot the mirror head of the interior rearview mirror assembly, shown disposed at an adapter plate and mirror stay that is configured to attach at an interior portion of the vehicle;

FIGS. 3 and 4 are plan views of the actuator, adapter plate and mirror stay of FIG. 2;

FIG. 13 is a perspective view of the adapter plate attached to the actuator attached at a mounting plate of a mirror reflective element, shown with the mirror casing removed and the actuator not attached at the mirror stay;

FIG. 14 is an exploded view of the mirror stay and adapter plate of FIG. 13;

FIGS. 17 and 18 are perspective views of another mirror actuator, shown without a housing or cover portion and with a memory circuit feature;

FIG. 20 is a perspective view of the mirror actuator of FIGS. 17 and 18, showing additional details of the memory circuit;

FIG. 20A is an enlarged view of the area A in FIG. 20;

FIG. 21 is an enlarged view similar to FIG. 20A, showing a nominal position of the wiping element at the circuit pad; and FIG. 22 is another enlarged view, showing the wiping element when the mirror head is at a nominal position and at plus and minus 11 degrees from the nominal position.

DESCRIPTION OF THE PREFERRED EMBODIMENTS

Figure 1:
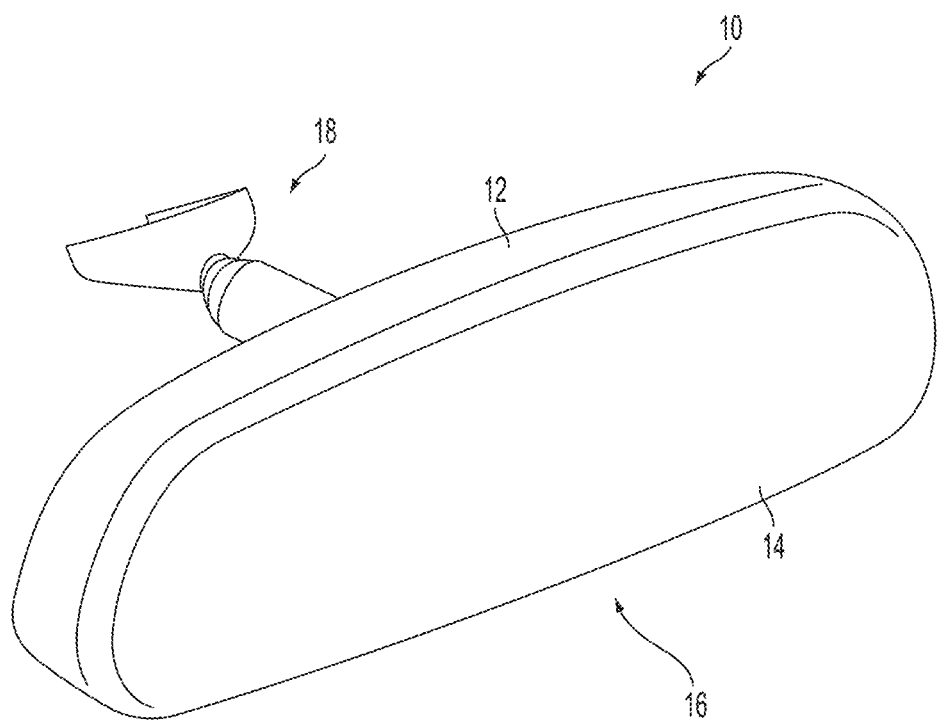
FIG. 1 is a perspective view of an interior rearview mirror assembly.

Referring now to the drawings and the illustrative embodiments depicted therein, an interior rearview mirror assembly 10 for a vehicle includes a casing 12 that houses a reflective element 14 (FIG. 1). The mirror reflective element 14 and mirror casing or housing 12 form the mirror head 16. In the illustrated embodiment, the mirror head 16 is adjustably mounted to an interior portion of a vehicle (such as to an interior or in-cabin surface of a vehicle windshield or a headliner of a vehicle or the like) via a mounting structure or mounting configuration or assembly or stay 18. The mirror head 16 is adjustable relative to the mirror mount or stay 18 via an electrically powered actuator 20, which is operable to adjust the mirror head to provide a desired or selected rearward view to the driver of the vehicle.

Figure 15:
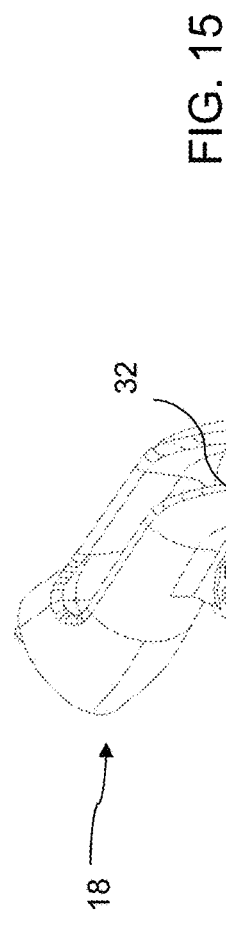
FIG. 15 is a perspective view of the actuator, adapter plate, mirror stay and mirror reflective element of FIG. 13, with the actuator attached to the adapter plate and mirror stay and detached from the mounting plate of the mirror reflective element.
Figure 16:
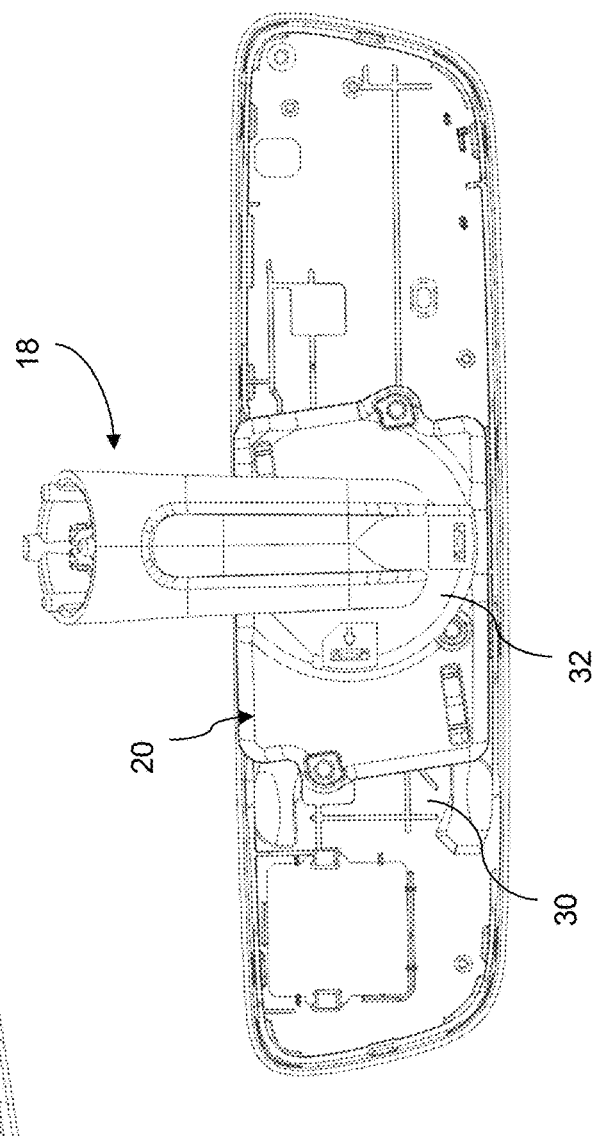
FIG. 16 is a plan view of the mirror stay, adapter plate, actuator and mirror reflective element of FIG. 15, with the actuator attached at the mirror reflective element.

In the illustrated embodiment, the actuator 20 comprises a body 22 that houses two motors 24, 26 and gear elements that are rotatably driven by the motors, with the body 22 configured to attach at a mounting plate or back plate 30 (FIGS. 13, 15 and 16) at the rear of the mirror reflective element. The body 22 of the actuator attaches to the mounting plate 30 such as via screws that engage screw holes 30a of the mounting plate 30. The mounting plate 30 may comprise the backing plate of the mirror reflective element 14 or may comprise a separate mounting plate of the actuator, such that the mounting plate is attachable at the mirror head or backing plate to mount the actuator 20 and mounting plate 30 as a unit in the mirror head.

The actuator 20 comprises an attachment plate or element or adapter plate 32 for attaching at the lower part of the mirror stay 18. The adapter plate 32 pivotally attaches at a rear side or portion of the body 22 relative to the side or portion of the body 22 attached at the back plate 30. The adapter plate 32 pivotally attaches at the body 22 of the actuator and pivots relative to the body 22. As will be discussed further below, when one or both motors 24, 26 are electrically powered to adjust the body 22 and the reflective element 14 and the mirror head 16 relative to the mirror stay 18, the adapter plate 32 pivots relative to the body. The system may also be manually adjusted (i.e., the adapter plate can pivot relative to the body without use of one or both motors).

Figure 10:
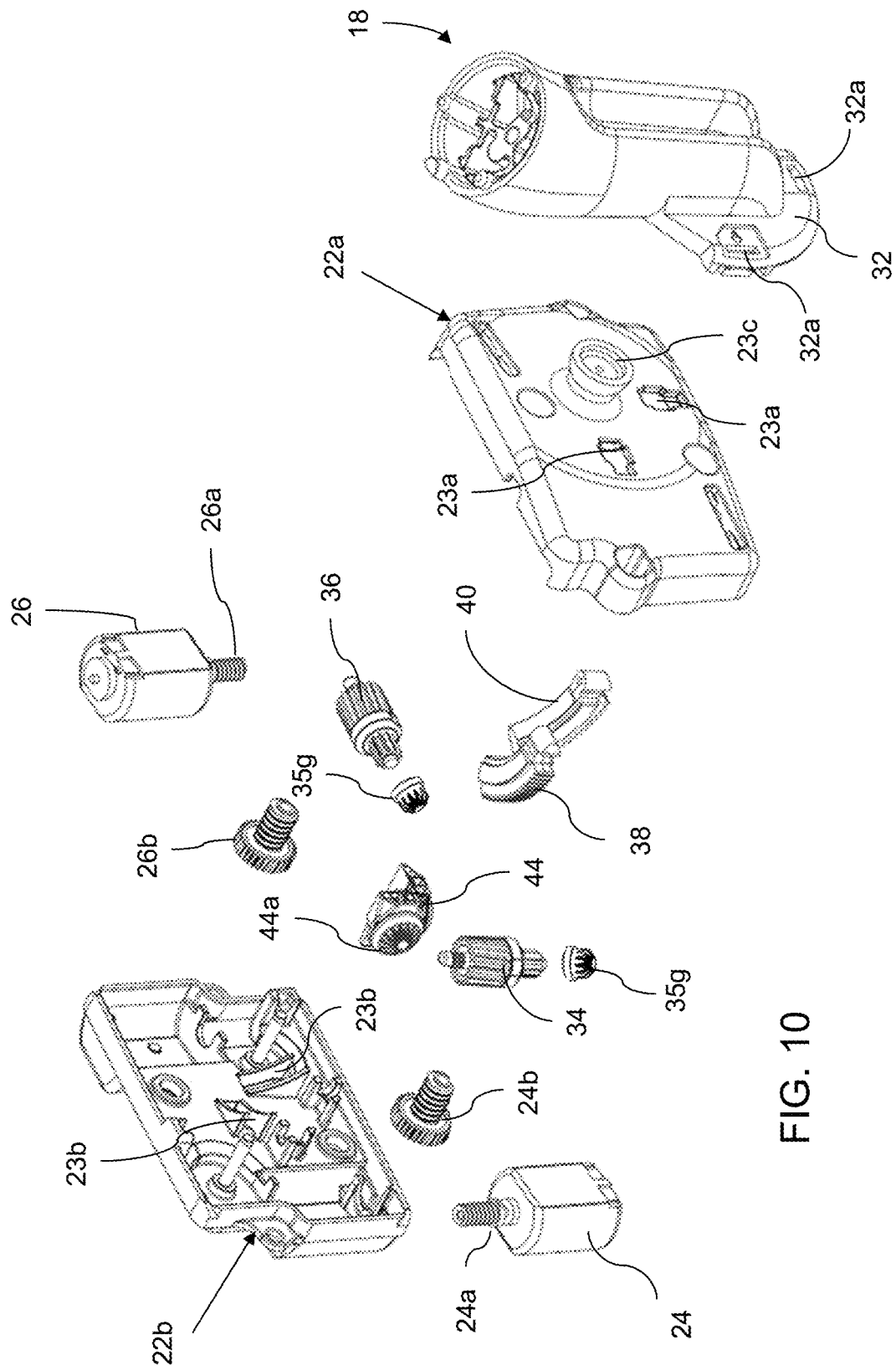
FIG. 10 is an exploded perspective view of the actuator, adapter plate and mirror stay.

In the illustrated embodiment (and such as shown in FIG. 10), the motors 24, 26 are housed within the housing or body 22, which comprises a front housing portion 22a and a rear housing portion 22b that are attached together to encase the motors. The front housing portion 22a provides a front or forward wall of the housing (forward with respect to the forward direction of travel of the vehicle when the mirror assembly is mounted in the vehicle) and the rear housing portion 22b provides a rear wall of the housing (rearward of the front housing portion with respect to the forward direction of travel of the vehicle when the mirror assembly is mounted in the vehicle) substantially parallel to the front wall of the housing. The motors, when powered, rotatably drive respective output gears or worm gears 24a, 26a, which engage and rotatably drive a respective main gear 24b, 26b, which in turn engage and rotatably drive a respective clutch subassembly 34, 36. The worm gears 24a, 26a of the motors 24, 26 rotate about an axis parallel to the front and rear walls of the housing 22. The main gears 24b, 26b rotate about an axis perpendicular to the rotational axis of the worm gears and substantially perpendicular to the front and rear walls of the housing 22. The clutch subassemblies 34, 36 rotate about different axes, where clutch subassembly 34 rotates about a vertical axis parallel to the front and rear walls of the housing and clutch subassembly 36 rotates about a horizontal axis parallel to the front and rear walls of the housing. Thus the clutch subassemblies 34, 36 rotate about axes that are orthogonal to one another. The clutch subassemblies 34, 36 engage respective output arc gear elements 38, 40 and, when one or both clutch subassemblies is rotatably driven (such as via rotation of the respective motor), the respective clutch subassembly imparts movement of the respective arc gear element 38, 40 to pivot the mirror head relative to the mirror stay 18.

The arc gear elements 38, 40 protrude through respective apertures 23a in the front housing portion 22a and attach (such as via snap-attachment) at one end to the adapter plate 32 at the adapter plate attachment elements 32a. The other ends of the arc gear elements are received at arcuate receiving portions 23b of the rear housing portion 22b, whereby movement of the arc gear elements relative to the housing 22 pivots the adapter plate relative to the housing. Thus, when the mirror stay 18 is mounted at an interior portion of the vehicle and the adapter plate 32 is fixed to the mirror stay, movement of the arc gear elements 38, 40 pivots the actuator 20 relative to the mirror stay and adapter plate.

Figure 5:
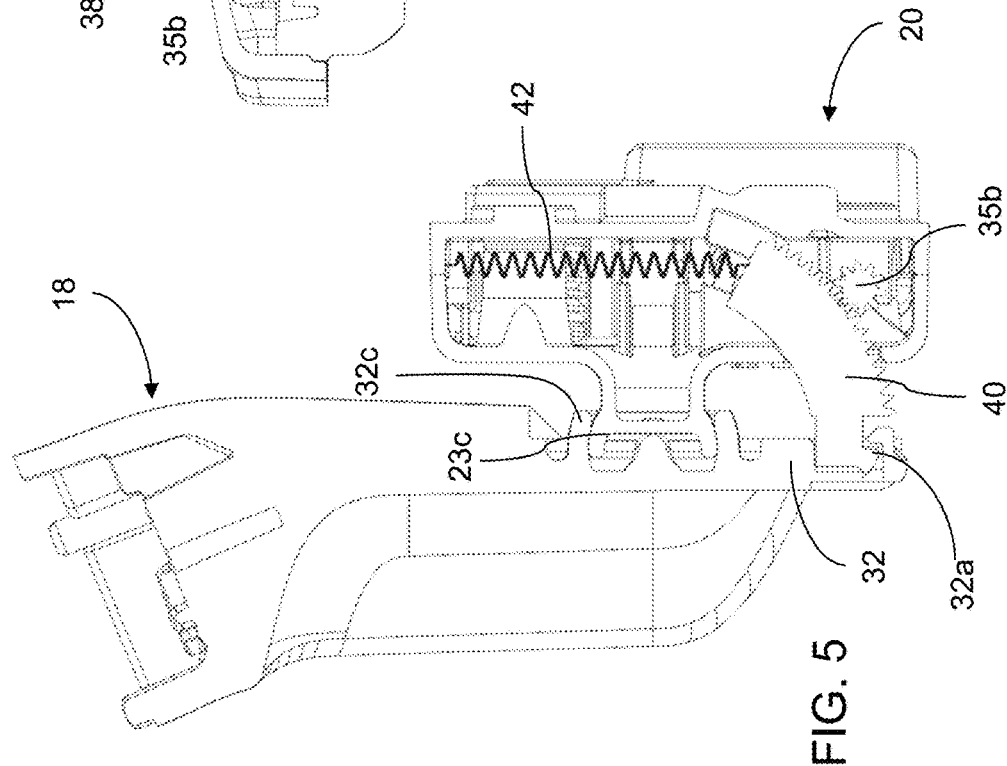
Figure 8:
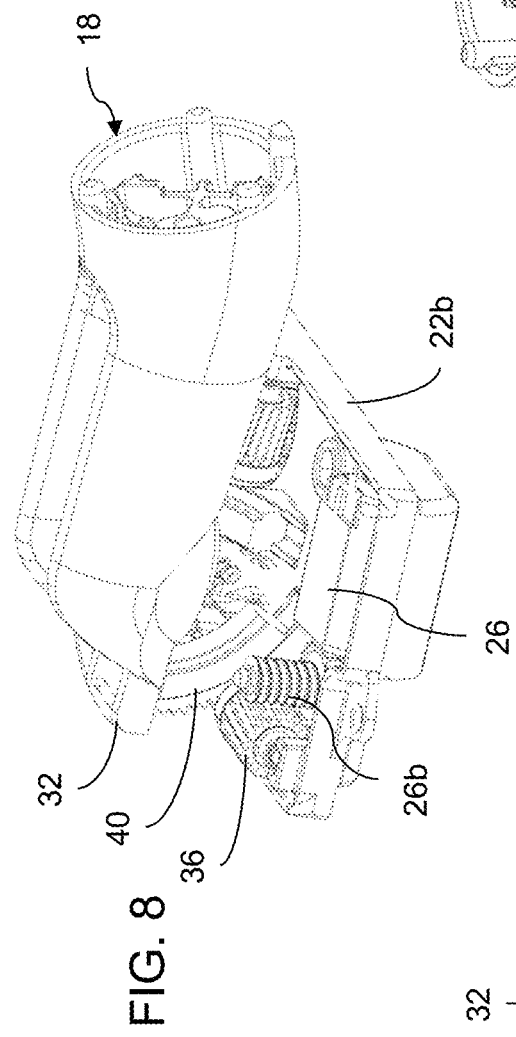
FIGS. 8 and 9 are perspective views of the actuator, adapter plate and mirror stay of FIG. 7.
Figure 7:
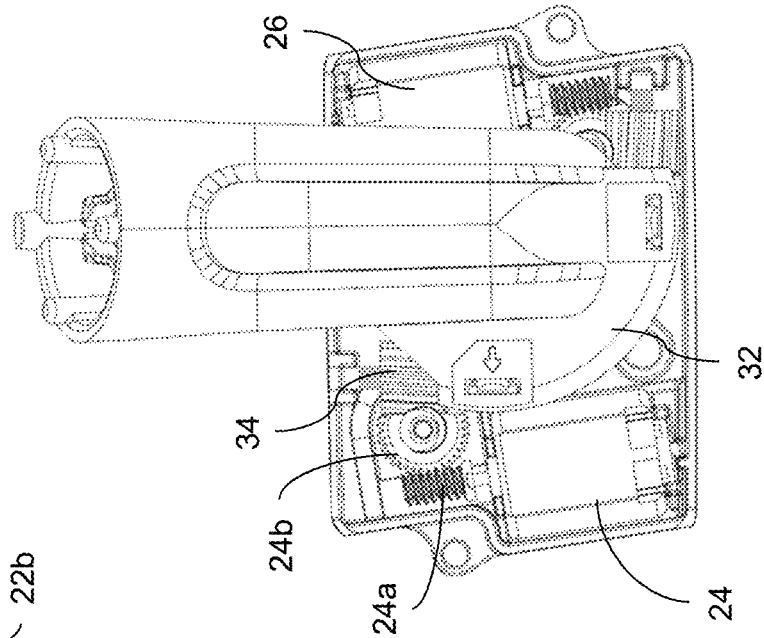
FIG. 7 is a plan view of the actuator, adapter plate and mirror stay of FIG. 2, with a housing or cover portion removed from the actuator.

As shown in FIG. 5, the adapter plate 32 comprises a pivot element 32c (such as a socket element) that pivotally receives a pivot element 23c to form part of a pivot joint at which the plate 32 is pivotally attached at the front housing portion 22a. The arc gear elements 38, 40 protrude through respective apertures 23a in the front housing portion 22a and snap attach at the adapter plate 32. Thus, when the gears are rotatably driven by the motors, movement of the arc gear elements 38, 40 relative to the housing 22 imparts pivotal movement of the actuator body or housing 22 relative to the adapter plate 32, and thus pivots the mirror head 16 relative to the adapter plate 32 and the mirror stay 18.

Figure 6:
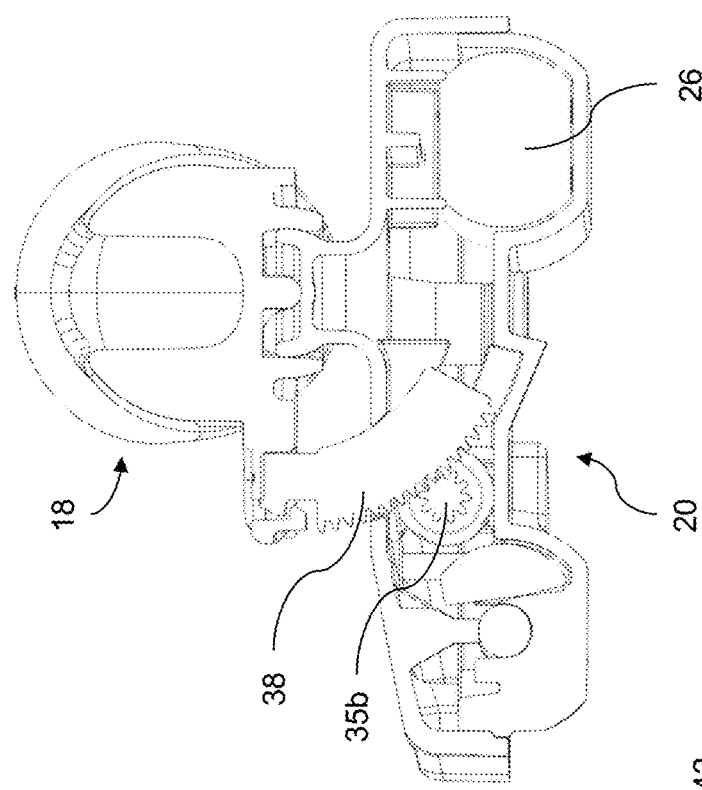
FIGS. 5 and 6 are sectional views of the actuator, adapter plate and mirror stay of FIG. 2.

Each arc gear element 38, 40 functions to pivot the mirror head about a respective axis at the pivot joint via the mirror head's connection to the housing 22. For example, movement of arc gear element 38 (FIG. 6) relative to the actuator pivots the mirror head about a generally vertical axis (with the mirror stay mounted at the vehicle) and movement of arc gear element 40 (FIG. 5) pivots the mirror head about a generally horizontal axis. In other words, when the (mirror assembly) is mounted at the vehicle (e.g., via the mirror stay mounted at the windshield), the mirror stay 18 is oriented substantially vertical and movement of the actuator relative to the arc gear element 38 pivots the mirror head left and right (about a generally vertical axis) and movement of the actuator relative to the arc gear element 40 pivots or tilts the mirror head up and down. As shown in FIG. 5, the arc gear element 40 is biased toward the respective receiving portion 23b, such as via a spring element 42 or other suitable biasing element. The spring counterbalance assists the actuator in movement of the mirror head in the vertical direction of travel (about the horizontal axis), in order to decrease the required actuator torque. When pivoting the mirror head in the vertical direction, the actuator must overcome the force of gravity, and the spring counterbalance reduces that external force. Conversely, when the actuator pivots the mirror head downward (and thus works against the biasing force of the spring element), the spring counter balance again reduces the external force of gravity (which could otherwise cause the mirror head to drop or pivot faster or a greater distance than intended). Because the actuator is not over-worked (to overcome the force of gravity) when pivoting the mirror head upwards and is not over-driven (via the additional force of gravity) when pivoting the mirror head downward, movement of the actuator aided by the spring counter balance 42 is smoother, which serves to improve sound quality during operation of the actuator.

Figure 11:
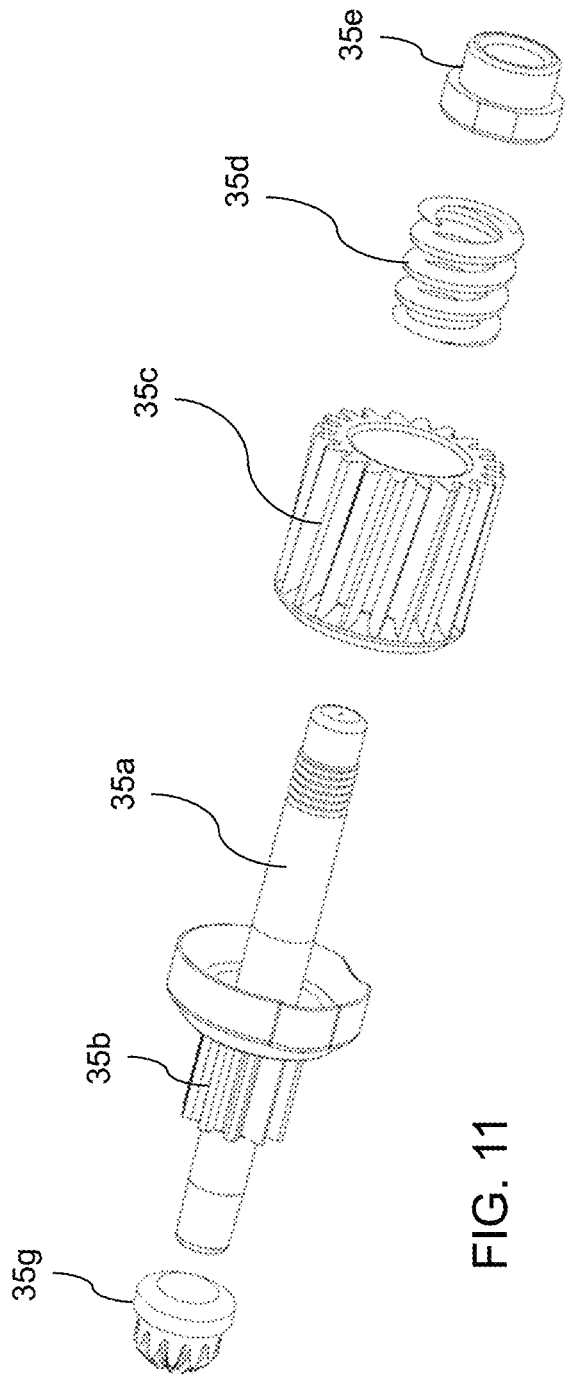
FIG. 11 is an exploded perspective view of a clutch gear subassembly of the actuator.
Figure 12:
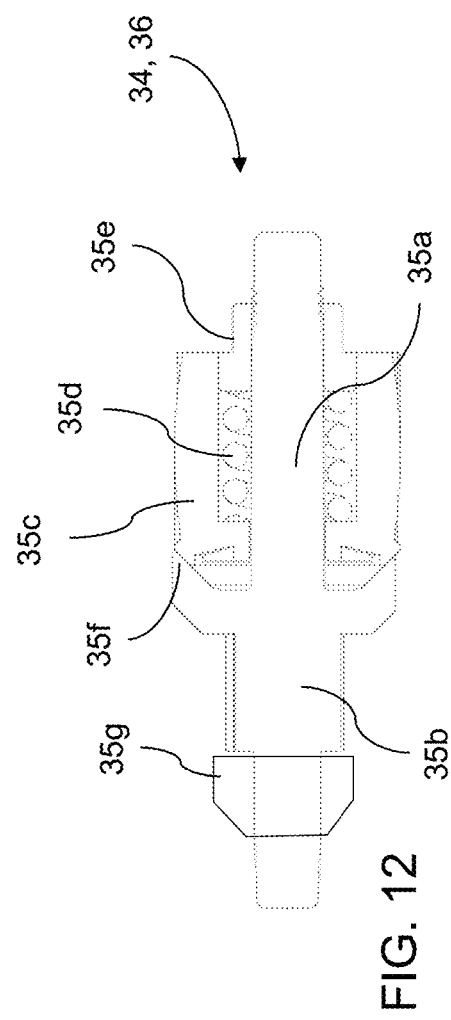
FIG. 12 is a sectional view of the clutch gear subassembly of FIG. 11.

As shown in FIGS. 11 and 12, the clutch subassembly 34, 36 comprises a drive shaft 35a having a drive gear 35b thereat, and a helical gear 35c disposed on the drive shaft 35a. A spring 35d and crimp washer 35e are disposed at the drive shaft and the spring 35d urges or biases the helical gear 35c toward and into engagement with a clutch interface surface 35f at the drive shaft 35a. The gear train (comprising the gears 24a, 24b and 26a, 26b) engages and rotatably drives helical gear 35c of the respective clutch subassembly, which in turn rotates drive gear 35b engaging respective arc gear elements 38, 40 to pivot the mirror head. If torque is provided to the drive shaft to a certain or sufficient degree or in a certain manner (such as when the driver of the vehicle manually adjusts the mirror head), the drive shaft 35a will rotate relative to the helical gear 35c along the primary axis. For example, a driver may manually adjust the mirror head, thereby causing movement of one or more arc gear elements as the driver manipulates the mirror head. The moving arc gear element provides torque at the respective drive gear 35b, which in turn provides torque via the drive shaft to the helical gear 35c. If the helical gear 35c is resisted via the respective main gear 24a, 24b and motor 24, 26, the torque is felt at the drive shaft which, as described above, may rotate relative to the helical gear 35c. Thus, if a user provides a force to manually adjust the mirror head (and thereby cause movement of one or more arc gear elements), the clutch subassembly may allow (via rotation of the drive shaft relative to the helical gear) movement of the arc gear and corresponding rotation of the drive gear with reduced or nonexistent movement of the motor.

The spring 35d provides pressure between the helical gear 35c and the drive shaft 35a at the clutch interface surface 35f. As shown in FIG. 12, the clutch interface surface 35f comprises an angled surface (at an acute angle relative to the longitudinal axis of the drive shaft, such as an angle greater than about 30 degrees and less than about 60 degrees). In the illustrated embodiment, the clutch interface surface 35f is at a 45 degree angle relative to the longitudinal axis of the drive shaft. The 45 degree clutch interface provides more surface area than a traditional flat plate clutch, thereby increasing the torque required to promote relative motion between the drive shaft 35a and the helical gear 35c over the torque that may be required if the clutch interface were not angled. The clutch assembly 34, 36 may also include a beveled gear 35g non-rotatably attached or keyed to the drive shaft for engaging a corresponding beveled gear of a memory pod 44 that tracks the position of the mirror head.

Figure 9:
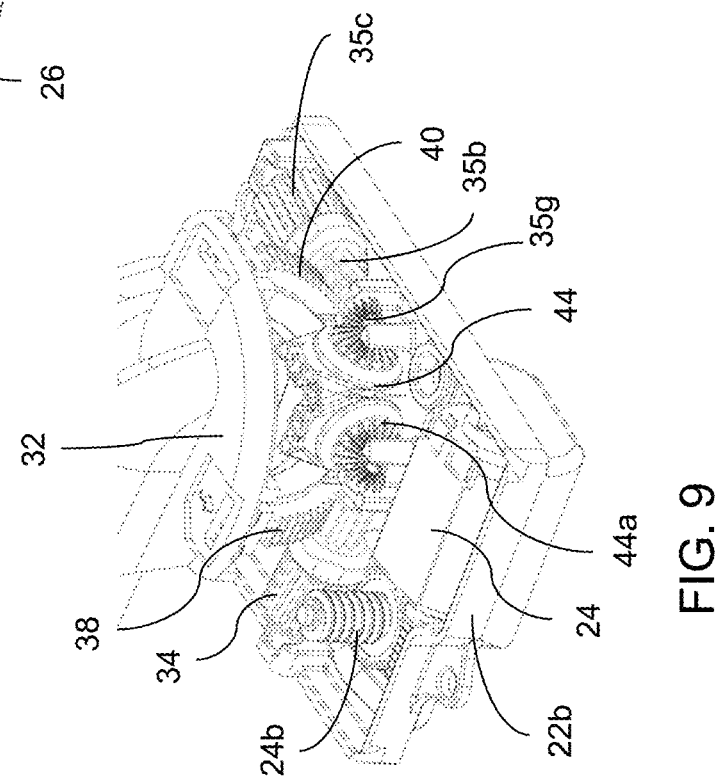

As shown in FIGS. 9 and 10, the memory pod or element 44 of the actuator 20 is disposed at the rear housing portion 22b and engages the beveled gear 35g at the end of each of the clutch subassemblies. The memory pod comprises beveled gear elements 44a that engage the respective clutch subassemblies 34, 36 and that rotate when the drive shaft 35a and beveled gear 35g of the clutch assembly rotates. The X-Y axis memory pods can be made into a 1-piece system for direct connection to the gear train. Thus the memory pod 44 may comprise a single element that engages both the gear train of motor 24 moving arc gear element 38 and the gear train of motor 26 moving arc gear element 40 via respective beveled gear elements 44a. The clutch subassembly meshes with the respective arc gear element via the respective drive gear 35b and is connected to the memory pod 44 via respective beveled gears 35g. Because the memory pod 44 is rotated when the drive shaft 35a of the clutch subassembly 34 is rotated, the memory pod will be engaged both when the motors of the actuator affect the mirror head and when the mirror head is adjusted manually relative to the mirror stay. This allows for manual driving of the mirror head (i.e., manual adjustment of the mirror head by the driver) relative to the mirror stay, while staying tied to the memory system.

In other words, because the beveled gear 35g is keyed to the output shaft 35a and gear 35b of the clutch assembly, any time the mirror head is adjusted (either manually or via actuation of one or both motors of the actuator) relative to the adapter plate and mirror stay, one or both of the beveled gears 35g of the clutch assembly will rotate and one or both of the beveled gears 44a of the memory pod 44 will respectively rotate. Rotation of both of the beveled gears 44a of the memory pod 44 is electronically tracked so that the system knows the position of the respective arc gear element 38, 40 relative to the actuator housing at any time. Thus, when a driver adjusts the mirror head to a position that provides the preferred rearward view, that position of the mirror head is electronically tracked via the memory pod and the driver may store that position in memory. After the memory position is stored, the mirror head may be moved manually or via actuation of the actuator to a different position or orientation. The actuator is operable (such as automatically upon startup of the vehicle or via actuation of a user actuatable input in the vehicle) to adjust the mirror head to return the mirror head to the position stored in memory by operating one or both motors until the memory pod gears are at the position they were when the mirror head was previously in the stored position or orientation.

As best shown in FIGS. 13 and 14, the adapter plate 32 is configured for attachment to the lower end of the mirror stay 18 and for receiving respective ends of the arc gear elements 38, 40 at the adapter plate attachment elements 32a. For example, the adapter plate 32 may snap attach at the mirror stay 18 via a snap attach element 32b at the adapter plate 32 that corresponds to a snap attach element at the mirror stay 18. The adapter plate may also be integrally formed with the mirror stay, but maintaining separate components for the mirror stay and the adapter plate allows for easier integration of the actuator to many mirror systems and vehicles (i.e., the adapter plate may be received at various different embodiments of mirror stays). For example, the stay may be used to bias mirror default angle depending on the country of use resulting in the actuator being required to accommodate less horizontal angular travel. This also means that the same actuator can be used in many different vehicles, regardless of the vehicle mounting method. The actuator can be placed into many mirror combinations by using a common mounting pattern, such as the snap attach element 32b at the adapter plate and a corresponding snap attach element at the given mirror stay. Additionally, the adapter plate may be adapted to correspond to a given mirror stay while maintaining the configuration to the actuator 20. The common or universal actuator thus may be mounted to the selected mirror attachment plate/reflective element and the adapter plate may be mounted to the selected mirror stay via common attachment points or elements. Optionally, the stay/mirror foot can be produced as a one-piece element in conjunction with actuator adapter plate, which serves to require fewer components.

Optionally, the actuator may include a memory feature that detects translational movement of the arc gear elements relative to the rear housing portion. For example, and with reference to FIGS. 17-22, an actuator 120 includes a circuit element 146 (such as a flexible circuit element or the like)

that is disposed at the rear housing portion 122b and that electrically connects to the motors 124, 126 via connecting portions 146a and that has a connecting end 146b for electrical connection to a circuit board of the mirror head. The circuit board of the mirror head includes control circuitry for controlling the motors 124, 126 and for determining the position or orientation of the mirror head via the memory feature. The memory feature is provided via a memory wiper element 148 disposed at a side of each of the arc gear elements 138, 140 engaging and moving along (as the arc gear elements move) respective carbon traces 150 at the contact pads or circuits 146c, 146d of the circuit element 146.

Figure 19:
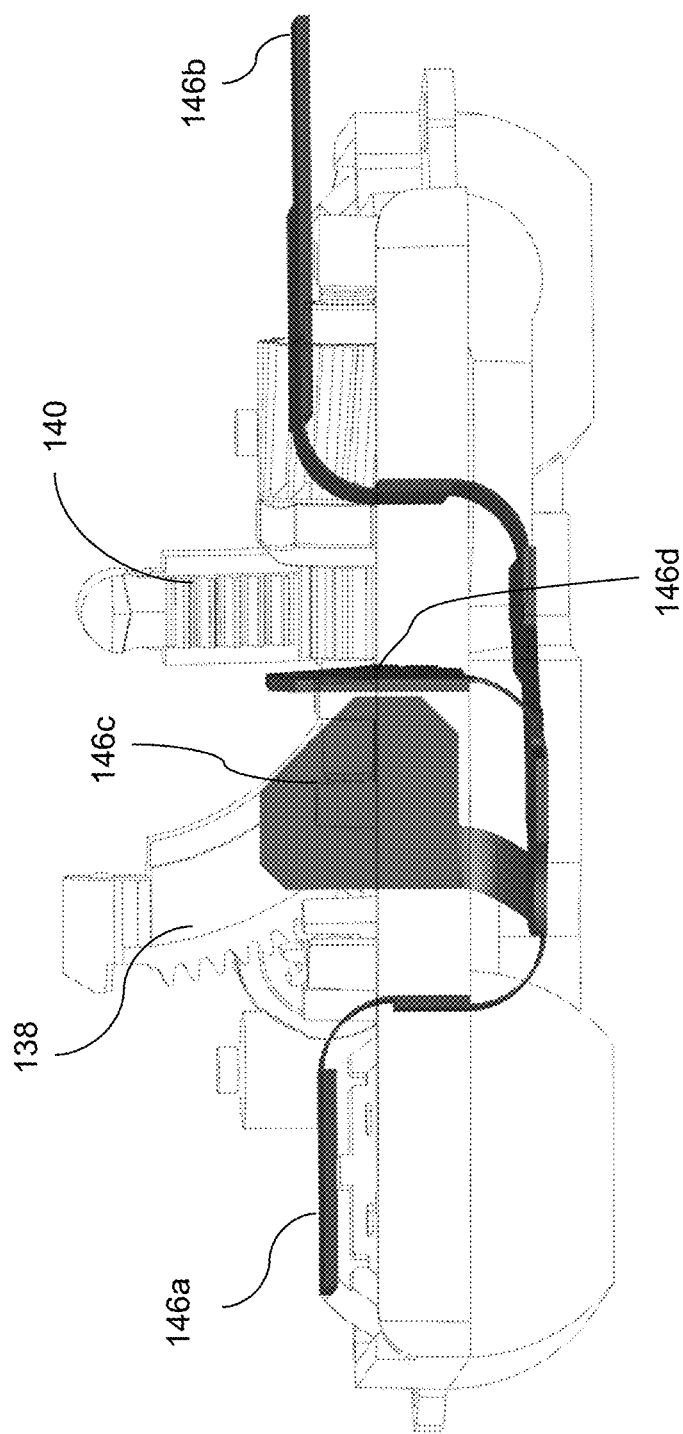
FIG. 19 is a side elevation of the mirror actuator of FIGS. 17 and 18.

As shown in FIG. 19, the contact pad 146c is disposed along a side of the arc gear element 138 and the contact pad 146d is disposed along a side of the arc gear element 140. The wiper element 148 is disposed at the side of the respective arc gear element and slidably engages the carbon traces 150 at the respective contact pad 146c, 146d of the circuit element as the respective arc gear element is moved via manual adjustment of the mirror head or electrical adjustment via actuation of the actuator. As shown in FIG. 21, the wiper element 148 may be positioned at a generally central region of the carbon traces 150 when the mirror head is at a nominal position, and, such as shown in FIG. 22, the wiper element 148 may move upward or downward along the carbon traces to positions that are plus or minus about 11 degrees from the nominal position for that pivot axis (e.g., horizontal pivot axis or vertical pivot axis).

The horizontal and vertical travel motors 124, 126 are connected to the memory system using the semi-flex PCB routing provided by the flexible circuit element 146, and the electrical output from the circuit is provided to outside of the actuator via the connecting end 146b. The memory system comprises "memory wipers," which may comprise sheet metal spring fingers that are attached to the arc gear elements or output gears and that touch against carbon traces 150 on the memory boards 146c, 146d, changing their resistance values as they move along the carbon traces. Thus, as the actuator arc gears move electrically or manually, the wipers slide along the arc shaped carbon pads on the circuit element and change the resistance through the circuit (and the resistance is determined or measured via a potentiometer). Therefore, a given resistance measured through the circuit may correspond to a given location or rotation of the respective arc gear elements and the system may be able to determine the orientation of the mirror head. The memory system, including the wipers and conductive traces, may utilize aspects of the memory functions described in U.S. provisional applications, Ser. No. 63/201,112, filed Apr. 13, 2021, and/or Ser. No. 63/198,589, filed Oct. 29, 2020, which are hereby incorporated herein by reference in their entireties.

Thus, when the mirror head is adjusted (either manually or via actuation of one or both motors of the actuator) relative to the adapter plate and mirror stay, one or both of the wiper elements 148 will slide along the respective carbon traces 150 and that movement is electronically tracked so that the system knows the position of the respective arc gear element 138, 140 relative to the actuator housing at any time. Thus, when a driver adjusts the mirror head to a position that provides the preferred rearward view, the driver may store that position in memory. After the memory position is stored, the mirror head may be moved manually or via actuation of the actuator to a different position or orientation. The actuator is operable (such as automatically upon initial ignition on or vehicle startup or via actuation of a user actuatable input in the vehicle or responsive to a signal from or associated with a passive entry system of the vehicle that is indicative of the vehicle user approaching the vehicle or unlocking the vehicle door or opening the vehicle door to enter the vehicle) to adjust the mirror head to return the mirror head to the position stored in memory by operating one or both motors until the wiper elements are at the position they were when the mirror head was previously in the stored position or orientation.

Optionally, the memory function of the actuator may position the mirror head at a preselected orientation responsive to determination of a particular driver of the vehicle (or responsive to a user input, such as similar to a memory seat setting and feature). For example, the mirror assembly may include an in-cabin viewing camera that views and captures image data of a driver's head region, such as for or as part of a driver monitoring system of the vehicle. The system may recognize the identity of the driver and operate the actuator to position the mirror head at the preselected orientation saved in memory for that driver.

When combining the memory actuator and an in-cabin viewing camera (such as part of a driver monitoring system) at or in the interior rearview mirror assembly, the actuator or system (and algorithms) may physically calibrate or optimize or adjust the mirror head position (and thus the mirror reflection that the driver would see at the mirror reflective element) relative to the driver's specific eye points and/or other identified features of the driver and/or interior of the vehicle within the field of view of the in-cabin viewing camera. By doing this, the driver monitoring camera's field of view would also be optimized by such positioning of the driver's face/head in a common zone within the camera's imager. The camera would be fixed to the mirror head (thus when the mirror angle is adjusted, so is the camera), and the algorithm would detect the position of the driver's face in the image data captured by the camera and then, based on that position information, the controller or ECU could drive the memory actuator to a new position with feedback from the memory system in the actuator. In other words, the driver may manually position the mirror head to a position that provides an optimized mirror reflection for the driver's rearward view, at which point the camera detects the position of the driver's face and/or eye points relative to the camera's field of view and stores that information in the memory system. The mirror head may also be pivoted automatically based on a preset algorithm that, via processing of image data captured by the in-cabin viewing camera, determines a relationship between the mirror head and the driver and/or interior feature of the vehicle and operates the actuator to provide a position of the mirror head that corresponds to a preset relationship based on the algorithm (for example, a preset angle and distance of the mirror head relative to the driver of the vehicle or a preset orientation that positions the driver's head or an interior feature at a preset or previously saved position in the camera's field of view).

The system may determine an identity of the driver and store the manually selected or automatically calibrated or adjusted position of the mirror head for the determined identity of the driver. Then, to later reposition the mirror head at a position specific to the driver of the vehicle, the actuator may pivot the mirror head to match the relative face position and/or eye points relative to the camera field of view that is stored in memory. The actuator may also be programmed to pivot the mirror head to provide an optimized point of view for the driver based on preset measurement points (such as distance and angle of the mirror reflective element from the driver's eyes). Therefore, the system is capable of providing a memory position function that, via processing of image data captured by the driver viewing camera, matches the driver of the vehicle to an identity stored in memory and actuates the motors of the actuator to pivot the mirror head to a particular orientation for setting the desired rearward view of the identified driver. The particular orientation of the mirror head for setting the rearward view for the identified driver may be manually selected and preset by the particular driver of the vehicle (such as during an initial drive of the vehicle), so that later the memory position function can adjust the actuator and mirror head until a particular feature is at a preselected location within the image data captured by the camera. For example, the memory position function may determine when a particular feature is at the preselected location, such as based on eye points or the position of the drivers face within the captured image data, or such as based on location of a fixed element in the vehicle (e.g., such as a seat headrest or rear window or rear door of the vehicle) within the captured image data.

The actuator can be electrically controlled by integrating with the vehicle Local Interconnect Network (LIN) bus system. This allows a simple three wire connection to the mirror head or to the circuit board in the mirror head. All of the motor driving electronics and the memory functionality can be located directly in the mirror head, instead of requiring it to be controlled by the vehicle.

The mirror head may be electrically connected to the vehicle wire harness via various suitable means. For example, the main vehicle wire harness may plug into a connector at the mirror printed circuit board (PCB), and a jumper wire harness may electrically connect the mirror PCB to the actuator. Optionally, for example, the main vehicle wire harness may plug into a connector at the mirror PCB, and the actuator may have direct connection to the mirror PCB, with the actuator being electrically connected to the mirror PCB when the actuator is assembled to the mirror back plate. Optionally, the main vehicle wire harness may split into two connections, with one connector electrically connecting to the actuator and the other connector electrically connecting to the mirror PCB.

Optionally, the interior mirror assembly may comprise a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924; 10,046,706 and/or 10,029,614, and/or U.S. Publication Nos. US-2020-0377022; US-2019-0258131; US-2019-0146297; US-2019-0118717; US-2019-0047475 and/or US-2017-0355312, and/or U.S. patent application Ser. No. 17/301,853, filed Apr. 16, 2021, now U.S. Pat. No. 11,465,561, Ser. No. 16/949,976, filed Nov. 23, 2020, now U.S. Pat. No. 11,498,494, and/or Ser. No. 17/247,127, filed Dec. 1, 2020, now U.S. Pat. No. 11,505,123, which are all hereby incorporated herein by reference in their entireties.

The mirror head may be tiltable or pivotable between a mirror mode orientation, where the reflective element is positioned to provide the desired driver's rearward field of view, and a display mode orientation, where the mirror head is tilted upward or downward relative to the mirror mode orientation, such that the display is viewable by the driver while the reflective element reflects light from rearward of the vehicle and incident thereon upward or downward away from the driver's eyes. The mirror head may be tiltable or pivotable between the mirror mode orientation and the display mode orientation via the actuator that is electrically powered to impart the pivotal movement, or via manually flipping of the mirror head about a generally horizontal pivot axis.

The mirror assembly thus may provide a display system that can display video images across the entire reflective surface of an interior rearview mirror assembly. The display system may include a display device disposed at an upper region of the vehicle's interior cabin (or other location), such that, when the mirror head is tilted or angled or otherwise mechanically adjusted, the mirror reflective element reflects the displayed image across the entire reflective surface for viewing by the driver of the vehicle. Optionally, the display system may include a video display screen disposed in the mirror head and viewable (when activated) through the reflective element. For example, when the mirror head is adjusted to the "mirror mode", the driver can view the rearward field of view provided by the reflective element, but when the mirror head is tilted or adjusted (to the "display mode"), the displayed video images (such as derived from image data captured by a rearward viewing camera) are viewable by the driver of the vehicle, with the tilting of the mirror head causing the primary reflection off of the reflective element to be out of the driver's eyes (since it would be aimed up toward the headliner or down into the cabin area instead of out the rear window).

The mirror system includes the electronically operable actuator that is operable to adjust or pivot the mirror head between the mirror mode orientation and the display mode orientation. For example, the mirror actuator may move the mirror head to the display mode orientation responsive to a user input or responsive to the driver shifting the vehicle into a reverse gear, whereby a rear backup camera is actuated and the display displays video images derived from image data captured by the rear backup camera.

Optionally, the actuator may comprise a micro gearhead motor so as to provide a reduced profile or smaller package size of the actuator, such as by utilizing aspects of the reduced profile actuator described in U.S. Publication No. US-2018-0251069, which is hereby incorporated herein by reference in its entirety.

The display screen preferably displays the captured video images at the entire viewable portion of the display screen, in order to provide relatively large displayed images for viewing by the driver of the vehicle while the driver is normally operating the vehicle. In the illustrated embodiment, the user inputs are touch or proximity sensors disposed at a portion of the display screen. The video display screen, when normally operating to display video images captured by the camera, may display the video images over the entire display portion or active portion of the display screen and, responsive to a user input (such as a user or driver touching a portion of the display screen or touch screen), may display icons or indicia at a portion of the display screen to indicate where the user can touch to actuate or control the display settings or the like. The user inputs or touch sensors may comprise any suitable sensors or inputs, and may utilize aspects of the inputs and sensors described in U.S. Pat. Nos. 9,827,913; 9,598,016; 9,346,403; 8,730,553; 8,508,831; 8,154,418; 7,255,451; 7,253,723 and/or 7,224,324, which are hereby incorporated herein by reference in their entireties.

Optionally, the display may utilize aspects of the displays of the types disclosed in U.S. Pat. Nos. 5,530,240 and/or 6,329,925, which are hereby incorporated herein by reference in their entireties, and/or of display-on-demand or transflective type displays, such as the types disclosed in U.S. Pat. Nos. 7,855,755; 7,777,611; 7,626,749; 7,581,859;

7,446,924; 7,446,650; 7,370,983; 7,338,177; 7,274,501; 7,255,451; 7,195,381; 7,184,190; 6,690,268; 5,668,663 and/or 5,724,187, and/or in U.S. Publication No. US-2006-0050018, which are all hereby incorporated herein by reference in their entireties. The display may be viewable through the reflective element when the display is activated to display information.

Changes and modifications to the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
    a mirror mount that attaches at an interior portion of a vehicle;
    a mirror head having a reflective element, the mirror head pivotally attaching at the mirror mount;
    a back plate having a front side and a rear side separated by a thickness of the back plate, wherein the reflective element is attached at the front side of the back plate;
    wherein the mirror head comprises an actuator;
    wherein the actuator comprises a body portion and an adapter plate that is pivotable relative to the body portion, and wherein the body portion of the actuator is attached at the rear side of the back plate, and wherein the adapter plate is attached at the mirror mount;
    wherein the actuator comprises a pair of arcuate gear elements, and wherein each of the arcuate gear elements is movably received at the body portion and has an end attached at the adapter plate;
    wherein the actuator comprises a pair of motors operable to rotatably drive respective gears that engage the respective arcuate gear elements, and wherein, when the gears are rotatably driven, the gears move the respective arcuate gear elements to impart pivotal movement of the body portion of the actuator relative to the adapter plate and the mirror mount, and wherein the gears, when rotatably driven by the respective motors, move the respective arcuate gear elements along respective arcuate paths relative to the body portion; and
    wherein, with the mirror mount attached at the interior portion of the vehicle, the actuator, when actuated, pivots the body portion and mirror head in tandem relative to the mirror mount to adjust the mirror head to provide a rearward view for a driver of the vehicle.

2. The vehicular interior rearview mirror assembly of claim 1, wherein the arcuate gear elements are orthogonal to one another.

3. The vehicular interior rearview mirror assembly of claim 1, wherein the gears rotate about axes that are orthogonal to one another.

4. The vehicular interior rearview mirror assembly of claim 3, wherein the gears rotate about axes that are parallel to the rear side of the back plate.

5. The vehicular interior rearview mirror assembly of claim 1, wherein the body portion of the actuator comprises a housing that houses the gears and the motors, and wherein the arcuate gear elements protrude through respective apertures through a wall of the housing to attach at the adapter plate.

6. The vehicular interior rearview mirror assembly of claim 1, wherein the gears of the actuator comprise respective clutch subassemblies that allow for movement of the respective arcuate gear elements independent of actuation of the respective motors during manual adjustment of the mirror head relative to the mirror mount.

7. The vehicular interior rearview mirror assembly of claim 1, wherein the actuator comprises a memory element that electronically tracks a location of each arcuate gear element relative to the body portion to provide a memory position function of the mirror head.

8. The vehicular interior rearview mirror assembly of claim 7, wherein the gears of the actuator comprise respective clutch subassemblies and at least a portion of each respective clutch subassembly rotates responsive to movement of the respective arcuate gear element relative to the body portion, and wherein the memory element comprises memory pods that engage the respective rotatable portions of the clutch subassemblies to electronically track the location of each arcuate gear element relative to the body portion.

9. The vehicular interior rearview mirror assembly of claim 8, wherein the memory pods comprise respective gear elements that engage the respective rotatable portions of the respective clutch subassemblies.

10. The vehicular interior rearview mirror assembly of claim 7, wherein the memory element comprises an electrically conductive wiper element at each arcuate gear element, and wherein the electrically conductive wiper element engages a respective electrically conductive memory pad adjacent the respective arcuate gear element and moves along the respective electrically conductive memory pad when the mirror head is adjusted to electronically track the location of the respective arcuate gear element relative to the body portion.

11. The vehicular interior rearview mirror assembly of claim 7, wherein the memory position function operates to electronically track and store in memory the location of each arcuate gear element relative to the body portion and, responsive to an input, operates the actuator to pivot the mirror head to the stored location.

12. The vehicular interior rearview mirror assembly of claim 11, wherein the memory position function operates responsive to image data captured by a driver viewing camera disposed at the mirror head and movable with the mirror head.

13. The vehicular interior rearview mirror assembly of claim 12, wherein the memory position function processes image data captured by the driver viewing camera and, responsive to the input, operates the actuator to pivot the mirror head to position the face of a driver of the vehicle at a preset position within the image data.

14. The vehicular interior rearview mirror assembly of claim 13, wherein the memory position function (i) processes image data captured by the driver viewing camera to determine a position of the face of the driver of the vehicle within the image data when the driver has set the mirror reflective element at a particular orientation for the desired rearward view of the driver, (ii) stores the determined position of the face of the driver in memory and (iii) operates the actuator, responsive to the input, to pivot the mirror head to position the face of the driver at the determined position within the image data.

15. The vehicular interior rearview mirror assembly of claim 12, wherein the memory position function (i) processes image data captured by the driver viewing camera to determine an identity of the driver of the vehicle, (ii) stores in memory the location of each arcuate gear element relative to the body portion when the mirror reflective element is positioned at a particular orientation for setting the desired rearward view of the identified driver, and (iii) operates the actuator, responsive to the input, to pivot the mirror head to the particular orientation for the identified driver.

16. A vehicular interior rearview mirror assembly, the vehicular interior rearview mirror assembly comprising:
a mirror mount that attaches at an interior portion of a vehicle;
a mirror head having a reflective element, the mirror head pivotally attaching at the mirror mount;
a back plate having a front side and a rear side separated by a thickness of the back plate, wherein the reflective element is attached at the front side of the back plate;
wherein the mirror head comprises an actuator;
wherein the actuator comprises a body portion and an adapter plate that is pivotable relative to the body portion, and wherein the body portion of the actuator is attached at the rear side of the back plate, and wherein the adapter plate is attached at the mirror mount;
wherein the actuator comprises a pair of arcuate gear elements that are orthogonal to one another, and wherein each of the arcuate gear elements is movably received at the body portion and has an end attached at the adapter plate;
wherein the actuator comprises a pair of motors operable to rotatably drive respective gears that engage the respective arcuate gear elements, and wherein, when the gears are rotatably driven, the gears move the respective arcuate gear elements to impart pivotal movement of the body portion of the actuator relative to the adapter plate and the mirror mount, and wherein the gears, when rotatably driven by the respective motors, move the respective arcuate gear elements along respective arcuate paths relative to the body portion;
wherein, with the mirror mount attached at the interior portion of the vehicle, the actuator, when actuated, pivots the body portion and mirror head in tandem relative to the mirror mount to adjust the mirror head to provide a rearward view for a driver of the vehicle;
wherein the gears of the actuator comprise respective clutch subassemblies that allow for movement of the respective arcuate gear elements independent of actuation of the respective motors during manual adjustment of the mirror head relative to the mirror mount;
wherein the actuator comprises a memory element that electronically tracks a location of each arcuate gear element relative to the body portion to provide a memory position function of the mirror head; and
wherein the memory position function operates to electronically track and store in memory the location of each arcuate gear element relative to the body portion and, responsive to an input, operates the actuator to pivot the mirror head to the stored location.

17. The vehicular interior rearview mirror assembly of claim 16, wherein at least a portion of each respective clutch subassembly rotates responsive to movement of the respective arcuate gear element relative to the body portion, and wherein the memory element comprises memory pods having respective gear elements that engage the respective rotatable portions of the clutch subassemblies to electronically track the location of each arcuate gear element relative to the body portion.

18. The vehicular interior rearview mirror assembly of claim 16, wherein the memory element comprises an electrically conductive wiper element at each arcuate gear element, and wherein the electrically conductive wiper element engages a respective electrically conductive memory pad adjacent the respective arcuate gear element and moves along the respective electrically conductive memory pad when the mirror head is adjusted to electronically track the location of the respective arcuate gear element relative to the body portion.

19. The vehicular interior rearview mirror assembly of claim 16, wherein the memory position function operates responsive to image data captured by a driver viewing camera disposed at the mirror head and movable with the mirror head.

20. The vehicular interior rearview mirror assembly of claim 19, wherein the memory position function processes image data captured by the driver viewing camera and operates the actuator to pivot the mirror head to position a feature within the vehicle at a preset position within the image data.

21. The vehicular interior rearview mirror assembly of claim 20, wherein the memory position function (i) processes image data captured by the driver viewing camera to determine a position of the feature within the vehicle within the image data when the driver has set the mirror reflective element at a particular orientation for the desired rearward view of the driver, (ii) stores the determined position of the feature in memory and (iii) operates the actuator, responsive to the input, to pivot the mirror head to position the feature at the determined position within the image data.

22. A vehicular interior rearview mirror assembly, the vehicular interior rearview mirror assembly comprising:
a mirror mount that attaches at an interior portion of a vehicle;
a mirror head having a reflective element, the mirror head pivotally attaching at the mirror mount;
a back plate having a front side and a rear side separated by a thickness of the back plate, wherein the reflective element is attached at the front side of the back plate;
wherein the mirror head comprises an actuator;
wherein the actuator comprises a body portion and an adapter plate that is pivotable relative to the body portion, and wherein the body portion of the actuator is attached at the rear side of the back plate, and wherein the adapter plate is attached at the mirror mount;
wherein the actuator comprises a pair of arcuate gear elements that are orthogonal to one another, and wherein each of the arcuate gear elements is movably received at the body portion and has an end attached at the adapter plate;
wherein the actuator comprises a pair of motors operable to rotatably drive respective gears that engage the respective arcuate gear elements, and wherein, when the gears are rotatably driven, the gears move the respective arcuate gear elements to impart pivotal movement of the body portion of the actuator relative to the adapter plate and the mirror mount, and wherein the gears, when rotatably driven by the respective motors, move the respective arcuate gear elements along respective arcuate paths relative to the body portion;
wherein the body portion of the actuator comprises a housing that houses the gears and the motors, and wherein the arcuate gear elements protrude through respective apertures through a wall of the housing to attach at the adapter plate;
wherein, with the mirror mount attached at the interior portion of the vehicle, the actuator, when actuated, pivots the body portion and mirror head in tandem relative to the mirror mount to adjust the mirror head to provide a rearward view for a driver of the vehicle;

wherein the gears of the actuator comprise respective clutch subassemblies that allow for movement of the respective arcuate gear elements independent of actuation of the respective motors during manual adjustment of the mirror head relative to the mirror mount;

wherein the respective clutch subassemblies rotate about axes that are orthogonal to one another;

wherein the actuator comprises a memory element that electronically tracks a location of each arcuate gear element relative to the body portion to provide a memory position function of the mirror head;

wherein the memory element comprises an electrically conductive wiper element at each arcuate gear element, and wherein the electrically conductive wiper element engages a respective electrically conductive memory pad adjacent the respective arcuate gear element and moves along the respective electrically conductive memory pad when the mirror head is adjusted to electronically track the location of the respective arcuate gear element relative to the body portion; and wherein the memory position function operates to electronically track and store in memory the location of each arcuate gear element relative to the body portion and, responsive to an input, operates the actuator to pivot the mirror head to the stored location.

23. The vehicular interior rearview mirror assembly of claim 22, wherein the memory position function operates responsive to image data captured by a driver viewing camera disposed at the mirror head and movable with the mirror head.

24. The vehicular interior rearview mirror assembly of claim 23, wherein the memory position function processes image data captured by the driver viewing camera and operates the actuator to pivot the mirror head to position a feature within the vehicle at a preset position within the image data.

25. The vehicular interior rearview mirror assembly of claim 24, wherein the memory position function (i) processes image data captured by the driver viewing camera to determine a position of the feature within the vehicle within the image data when the driver has set the mirror reflective element at a particular orientation for the desired rearward view of the driver, (ii) stores the determined position of the feature in memory and (iii) operates the actuator, responsive to the input, to pivot the mirror head to position the feature within the vehicle at the determined position within the image data.

* * * * *